United States Patent [19]

Pano et al.

[11] Patent Number: 5,022,796
[45] Date of Patent: Jun. 11, 1991

[54] CUTTING INSERT

[75] Inventors: Joseph Pano, Shave Zion, Israel; Hans Braun, Westfalen, Fed. Rep. of Germany

[73] Assignee: Iscar, Ltd., Midgal Tefe, Israel

[21] Appl. No.: 513,916

[22] Filed: Apr. 24, 1990

Related U.S. Application Data

[60] Division of Ser. No. 336,216, Apr. 11, 1989, Pat. No. 4,938,640, which is a continuation-in-part of Ser. No. 94,692, Sep. 9, 1987, abandoned.

[30] Foreign Application Priority Data

Sep. 10, 1986 [DE] Fed. Rep. of Germany ....... 3630845
Oct. 15, 1986 [DE] Fed. Rep. of Germany ....... 3635052

[51] Int. Cl.$^5$ .................. B23B 05/16; B23B 27/02; B23B 27/06
[52] U.S. Cl. .................................. 407/113; 407/110; 407/117

[58] Field of Search .................. 407/113, 115, 117; 83/835, 839, 845

[56] References Cited

U.S. PATENT DOCUMENTS

| 836,988 | 11/1906 | Oldham | 83/845 |
|---|---|---|---|
| 1,455,968 | 5/1923 | Proctor | 83/845 |
| 2,891,300 | 6/1959 | Shephard | 407/116 |
| 3,128,804 | 4/1964 | Scott | 407/115 |
| 3,656,219 | 4/1972 | Connelly | 407/117 |
| 3,660,877 | 5/1972 | Stein | 407/117 |
| 3,894,322 | 7/1975 | Pano | 407/110 |
| 4,012,820 | 3/1977 | Nowack | 407/117 |

Primary Examiner—William E. Terrell
Attorney, Agent, or Firm—Ladas & Parry

[57] ABSTRACT

A cutting insert for use in internal and external chamfering of pipe ends. The cutting insert is capable of ready and insertion and replacement in a metal cutting tool and can be held firmly in the tool holder in a predetermined position.

3 Claims, 2 Drawing Sheets

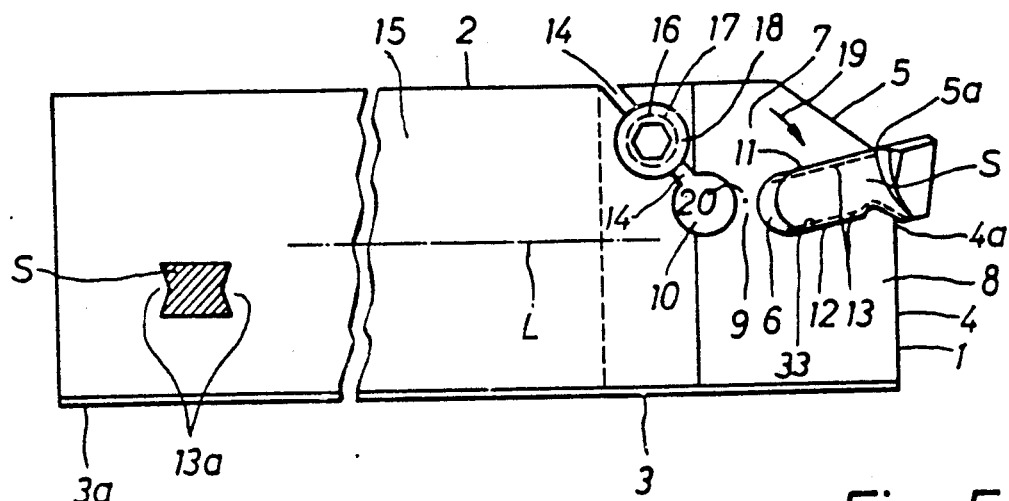
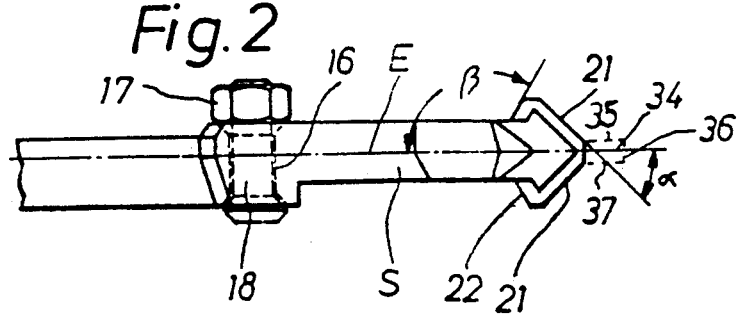
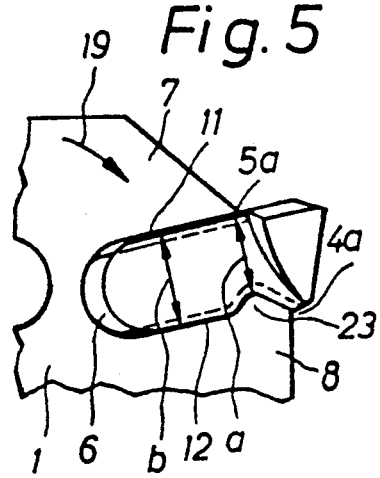

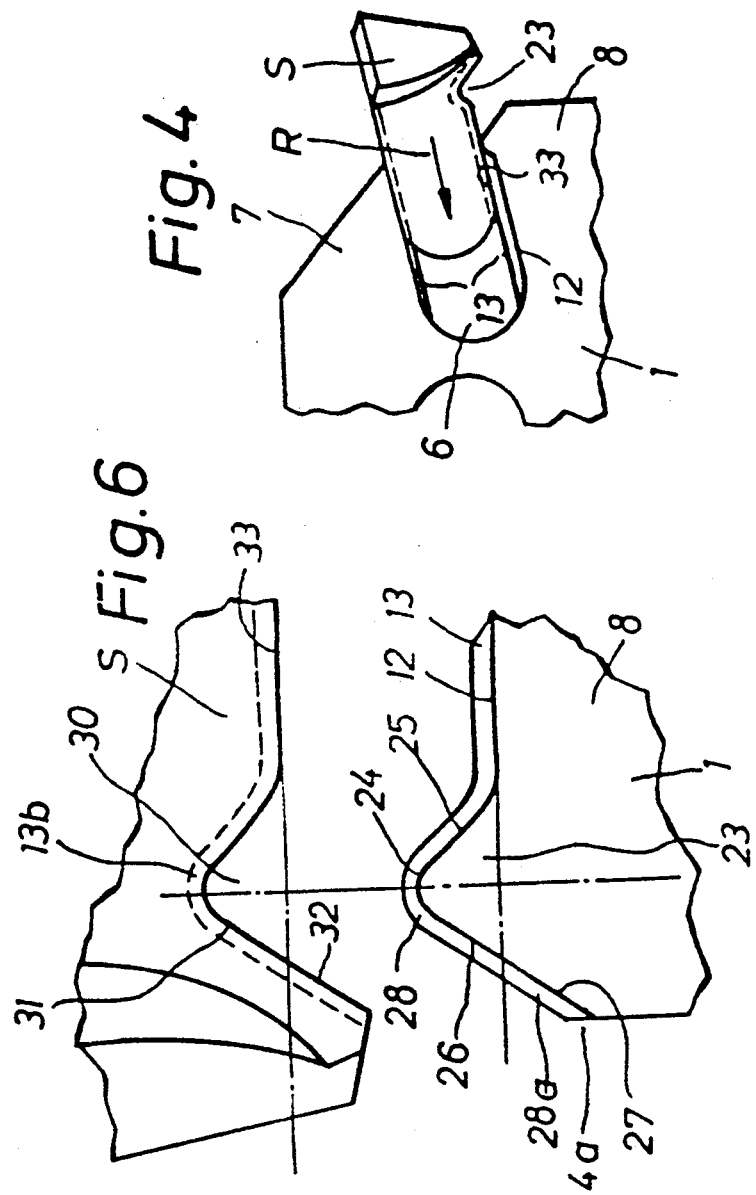

CUTTING INSERT

This is a Divisional of application Ser. No. 336,216 filed Apr. 11, 1989, U.S. Pat. No. 4,938,640 which is a CIP of application Ser. No. 07/094,692 filed Sept. 9, 1987 (now abandoned).

FIELD OF THE INVENTION

This invention relates to a metal cutting tool and is particularly concerned with metal cutting tools of the kind wherein a cutting insert is replaceably retained in a tool holder and which is used, e.g. in turning, parting, grooving, chamfering and end facing operations. Such cutting inserts should be capable of ready insertion and replacement and should be firmly held in the tool holder in a required, predetermined position.

BACKGROUND OF THE INVENTION

Various proposals have been made in the past to meet these requirements and in this connection attention is particularly directed to the Assignees' U.S. prior U.S. Pat. No. 3,894,322 and European patent specification No. 82300954.3. In both cases the insert is held between jaws formed integrally with the tool holder but whilst in the former case the jaws are screw biased into clamping the insert, in the latter case a wedge shaped insert is frictionally held within a wedge shaped slot defined between the jaws. The contiguous surfaces of the slot and the insert are formed with elongated keying arrangements so as to inhibit transverse movement of the insert retained within the slot in a direction transverse thereto. The European patent specification furthermore discloses the provision of the insert with an abutment shoulder which limits the degree of insertion of the insert into the holder. Whilst such hitherto proposed systems are in general effective in retaining the insert in its cutting position under the normal inwardly and laterally directing forces which act on the insert during cutting, it has been found that outward displacement of the insert may take place when traction forces are exerted thereon. Such traction forces may arise in the course of various cutting operations such as, for example, during the internal chamfering of a pipe edge.

SUMMARY OF THE INVENTION

It is therefore an object of the present invention to provide a cutting insert for use in a metal cutting tool and in which the above referred to disadvantage is substantially reduced.

According to the present invention there is provided a cutting insert for use in internal and external chamfering of pipe ends comprising an elongated body portion having a median longitudinal plane; upper and lower, substantially parallel, longitudinally directed surfaces of said body portion; a forward terminal cutting end portion; a first pair of cutting edges of said cutting end portion having adjacent leading ends, being symmetrically disposed with respect to said median plane and sloping rearwardly away from said median plane from said adjacent leading ends to respective spaced apart trailing ends thereof; a second pair of cutting edges of said cutting end portion symmetrically disposed with respect to said median plane and sloping rearward towards said median plane from adjacent said trailing ends of said first pair of cutting edges; an arched recess formed in an extending across said lower surface adjacent said cutting end and a pair of longitudinally extending keying grooves formed respectively in said surfaces and extending into said arched recess.

Thus, with a cutting tool incorporating a cutting insert in accordance with the invention, when the jaws have been displaced into clamping the insert the projection and recess means mate firmly and in this way the insert is firmly retained in position both against withdrawal, as a result of traction forces, and also against excessive insertion under inwardly directed forces.

BRIEF DESCRIPTION OF THE DRAWINGS

A preferred embodiment of the invention will now be described by way of example and with reference to the accompanying drawings in which:

FIG. 1 is a side elevation of a metal cutting tool in accordance with the invention;

FIG. 2 is a plan view from above of a portion of the tool shown in FIG. 1;

FIG. 3 is a cross-sectional view of a cutting insert forming part of the tool shown in FIGS. 1 and 2;

FIG. 4 is a side elevation of a front end of the tool shown in FIGS. 1 and 2 during insertion of the cutting insert;

FIG. 5 is a side elevation of a front end of the tool shown in FIGS. 1 and 2 after insertion of the cutting insert and prior to the biasing of the tool jaws into clamping the insert; and FIG. 6 is an enlarged view of corresponding portions of the cutting insert and tool holder shown spaced apart.

As seen in the drawings, the metal cutting tool comprises a flat, substantially rectangular holder 1. Formed integrally with one end of the holder 1 is a pair of clamping jaws 2 and 3 having opposed clamping surfaces 2a and 3a which have a convex V-shaped cross-sectional form and which define between them an insert seat 4. The upper jaw 2 is bounded by an edge 5 which slopes away from a corresponding edge 6 of the lower jaw.

Formed in the holder 1, adjacent to and extending away from the insert seat 4, is an elongated slot 7 which extends from the upper edge 8 of the holder towards the inner end of the seat 4 and is formed at its innermost end, adjacent the seat 4 and also at an intermediate position, with enlarged circular apertures 9 and 10, the two apertures communicating via an intermediate portion of the slot 7. The slot 7 as a whole is disposed at an acute angle (preferably 45°) with respect to a longitudinal axis L of the holder 1.

Fitted within the aperture 10 is a rotary expanding element 11 through which passes a screw 12, the arrangement being such that upon rotation of the screw 12 in a first sense the expanding element 11 is displaced so as, in turn, to displace the upper jaw 2 in the direction of the arrow 13 into an insert clamping position. During this displacement of the upper jaw 2, it effectively rotates in a clockwise direction about a connecting portion 14 of the holder between the inner end of the seat 4 and the adjacent circular aperture 9. Upon rotation of the screw 12 in the opposite sense, the expanding element 11 is so displaced as to allow the upper jaw 2 to spring back into its non-clamping position.

The lower jaw edge 6 has formed adjacent the outer end thereof, a substantially triangularly shaped abutment 15 which is directed inwardly with respect to the insert seat 4, the abutment having a trailing edge 16 and a leading edge 17 which is of extended length as compared with that of the trailing edge 16. The abutment 15 has an upper surface which is of V-shaped cross-sectional shape forming a continuation of the lower jaw edge.

A cutting insert 18 comprises a cutting head 19 and an elongated body 20. The cutting head is formed with a pair of leading cutting edges 21 which are disposed at an acute angle α with respect to a median line E of the cutting insert 18. The cutting head is furthermore formed with a pair of trailing cutting edges 22 which are disposed at an obtuse angle β with respect to the median line E. The cutting insert body 20 is formed with upper and lower edges 23 and 24 which are of respectively concave V-shaped cross-sectional shape and in which the corresponding V-shaped upper and lower jaw edges are adapted to be keyed. Formed in the lower insert edge adjacent the cutting insert head 19 is a triangularly shaped recess 25 which is formed with a trailing recess edge 26 and a leading recess edge 27 which is of extended length as compared with the length of the trailing edge 26. The recess edges 26 and 27 are formed with a concave V-shaped cross-section which are continuations of the lower insert edge 24.

Reference to FIG. 5 will show that the minimum transverse spacing a of the insert seat (between the tip of the abutment 15 and the opposite upper jaw edge 5) is equal to or greater than the maximum width b of the insert body 20. In consequence, therefore, and with the upper jaw 2 in its non-clamping position as shown in FIG. 4, it is possible simply to slide the insert 18 into the seat 4 in the direction of the arrow R, as shown in FIG. 4, until the abutment 15 is located opposite the recess 25 and the extended leading edge 17 of the abutment bears against the extended leading edge 27 of the recess. With the insert in this position, the screw 12 is now rotated, causing the rotary expanded element 11 to be displaced and this in turn displaces the upper jaw 7 into its clamping position in which the abutment 15 mates firmly within the recess 25 as seen in FIG. 5. When so clamped, the insert is firmly fixed in position both as regards possible further insertion into the seat and also as regards possible outward displacement under traction forces. These traction forces can particularly arise with an insert, of the kind just described, when it is used for chamfering the spaced-apart opposite edges of a parted pipe. Thus, whilst the cutting edges 21 can be used to chamfer the edge of one pipe, the trailing cutting edges 22 are used to chamfer the opposite edges of the other pipe and in the latter case, chamfering is accompanied by a traction force exerted on the insert. The provision of the mating abutment and recess ensures that in neither case is the insert displaced.

Preferably, the leading edges 17 and 21 of the insert 18 and the seat 4 are directed substantially normally to the resultant direction of the forces acting on the insert during cutting.

Optionally, and as is shown in dotted lines in FIG. 2 of the drawings, the insert can be provided with an additional cutting element 28.

We claim:

1. A cutting insert for use in internal and external chamfering of pipe ends comprising an elongated body portion having a median longitudinal plane; upper and lower, substantially parallel, longitudinally directed surfaces of said body portion; a forward terminal cutting end portion; a first pair of cutting edges of said cutting end portion having adjacent leading ends, being symmetrically disposed with respect to said median plane and sloping rearwardly away from said median plane from said adjacent leading ends to respective spaced apart trailing ends thereof; a second pair of cutting edges of said cutting end portion symmetrically disposed with respect to said median plane and sloping rearwardly towards said median plane from adjacent said trailing ends of said first pair of cutting edges; an arched recess formed in and extending across said lower surface adjacent said cutting end and a pair of longitudinally extending keying grooves formed respectively in said surfaces and extending into said arched recess.

2. A cutting insert according to claim 1 wherein said recess is of substantially triangular longitudinal section.

3. A cutting insert according to claim 2 wherein a leading surface of said recess is of extended length as compared with a trailing surface thereof.

* * * * *